(12) United States Patent
Lee et al.

(10) Patent No.: US 8,606,318 B2
(45) Date of Patent: Dec. 10, 2013

(54) METHOD AND APPARATUS FOR DETERMINING VALIDITY OF MOBILE SUBSCRIBER IDENTIFIER IN MOBILE COMMUNICATION TERMINAL

(75) Inventors: Jang-Bok Lee, Yongin-si (KR); Chang-Ho Sohn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1029 days.

(21) Appl. No.: 12/490,694

(22) Filed: Jun. 24, 2009

(65) Prior Publication Data

US 2009/0325641 A1    Dec. 31, 2009

(30) Foreign Application Priority Data

Jun. 30, 2008  (KR) ........................ 10-2008-0062528

(51) Int. Cl.
    *H04B 1/38*   (2006.01)
(52) U.S. Cl.
    USPC ......................................................... 455/558
(58) Field of Classification Search
    USPC ............... 455/558, 410, 419, 556.1; 713/150; 726/9, 17, 20
    See application file for complete search history.

(56) References Cited

U.S. PATENT DOCUMENTS

| 6,591,098 | B1 | 7/2003 | Shieh et al. |
| 6,697,637 | B1 | 2/2004 | Willey |
| 2001/0048025 | A1* | 12/2001 | Shinn .............................. 235/382 |
| 2005/0094592 | A1* | 5/2005 | Schmidt ......................... 370/328 |
| 2006/0139336 | A1* | 6/2006 | Mattingley-Scott et al. . 345/173 |

FOREIGN PATENT DOCUMENTS

| EP | 2 134 061 A2 | 12/2009 |
| KR | 10-2006-0089229 A | 8/2006 |
| KR | 10-2007-0061545 A | 6/2007 |
| KR | 10-2009-0128316 A | 12/2009 |

OTHER PUBLICATIONS

"3rd Generation Partnership Project; Technical Specification Group Services and System Aspects; 3G Security; Security architecture (Release 8)", 3GPP Standard; 3GPP TS 33.102, No. V8.0.0, Jun. 1, 2008, pp. 1-65, XP050376420.

* cited by examiner

*Primary Examiner* — Shaima Q Aminzay

(74) *Attorney, Agent, or Firm* — Jefferson IP Law, LLP

(57) ABSTRACT

A method and an apparatus for determining validity of a mobile subscriber identifier in a mobile communication terminal are provided. In the method, a temporary identifier assigned from a network is stored in a memory and a SIM card of the terminal. When a network authentication event occurs, the temporary identifier stored in the memory is compared with the temporary identifier stored in the SIM card. An identifier to be transmitted to the network is determined among an International Mobile Subscriber Identity (IMSI) and the temporary identifier stored in the SIM card depending on a result of the comparison.

10 Claims, 2 Drawing Sheets

METHOD AND APPARATUS FOR DETERMINING VALIDITY OF MOBILE SUBSCRIBER IDENTIFIER IN MOBILE COMMUNICATION TERMINAL

PRIORITY

This application claims the benefit under 35 U.S.C. §119(a) of a Korean patent application filed in the Korean Intellectual Property Office on Jun. 30, 2008 and assigned Serial No. 10-2008-0062528, the entire disclosure of which is hereby incorporated by reference.

BACKGROUND OF THE INVENTION

1. Field of the Invention

The present invention relates to a method and an apparatus for determining the validity of a mobile subscriber identifier of a mobile communication terminal. More particularly, the present invention relates to a method and an apparatus for determining the validity of a Temporary Mobile Subscriber Identity (TMSI) and a Packet Temporary Mobile Subscriber Identity (PTMSI) recorded in a Subscriber Identification Module (SIM) card.

2. Description of the Related Art

Generally, in a mobile communication network which uses a Global System for Mobile communication (GSM) and a Wideband Code Division Multiple Access (WCDMA) system, a terminal may receive service from the network after passing through an authentication procedure. For example, when power is turned on, a terminal using a GSM scheme transmits user authentication data stored in a SIM card to the network in order to perform the authentication procedure, and the network determines whether the terminal is eligible to receive service by checking the user authentication data transmitted from the terminal. Examples of the user authentication data stored in the SIM card include an International Mobile Subscriber Identity (IMSI), TMSI, and PTMSI. Here, the IMSI is a unique value corresponding to a subscriber that is assigned when a subscriber subscribes to a service. The IMSI does not change after being initially assigned, and includes a Mobile Country Code (MCC), a Mobile Network Code (MNC), and a mobile subscriber identifier number. The TMSI and the PTMSI are temporary values identifying the terminal, are arbitrarily changed by the network, and may be used instead of the IMSI for security purposes.

When a valid TMSI or PTMSI exists inside the SIM card, a conventional terminal attempts to obtain a service from a network by preferentially transmitting the TMSI or PTMSI, rather than the IMSI, to the network. However, when a service is provided by authenticating a terminal using only the TMSI or PTMSI of the terminal, even users who have no authority to use the service may still receive the service.

For example, to prevent some terminals from being used outside a specific network, a mobile service provider provides a network lock function of checking an MCC and an MNC from the IMSI recorded in the SIM card of the terminal, and, when an unauthorized MCC and MNC are received, preventing the terminal from performing a basic operation. However, in the conventional art, it has been reported that a terminal may pass through such a network lock by replacing the MCC and MNC by specific values, and then authenticate using a TMSI obtained from a different terminal during communication with the network, thereby obtaining a normal service for a relevant terminal.

Therefore, a technique of performing a network authentication procedure having higher security needs to be provided.

SUMMARY OF THE INVENTION

An aspect of the present invention is to address at least the above mentioned problems and/or disadvantages and to provide at least the advantages described below. Accordingly, an aspect of the present invention is to provide a method and an apparatus for determining validity of a mobile subscriber identifier in a mobile communication terminal.

Another aspect of the present invention is to provide a method and an apparatus for determining validity of a Temporary Mobile Subscriber Identity (TMSI) and a Packet Temporary Mobile Subscriber Identity (PTMSI) recorded in a Subscriber Identification Module (SIM) card of a mobile communication terminal.

In accordance with an aspect of the present invention, a method for determining validity of a mobile subscriber identifier in a mobile communication terminal is provided. The method includes storing a temporary identifier assigned from a network in a memory and a Subscriber Identification Module (SIM) card of the terminal, when a network authentication event occurs, comparing the temporary identifiers stored in the memory with the temporary identifier stored in the SIM card, and determining an identifier to be transmitted to the network, among an International Mobile Subscriber Identity (IMSI) and the temporary identifier stored in the SIM card depending on a result of the comparison.

In accordance with another aspect of the present invention, an apparatus for determining validity of a mobile subscriber identifier in a mobile communication terminal is provided. The apparatus includes a memory for storing a temporary identifier assigned from a network, a SIM card for storing the temporary identifier assigned from the network and an IMSI assigned when a subscriber subscribes a service, and a controller for comparing the temporary identifier stored in the memory with the temporary identifier stored in the SIM card, and for determining an identifier to be transmitted to the network depending on a result of the comparison when a network authentication event occurs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A technology for determining validity of a Temporary Mobile Subscriber Identity (TMSI) and a Packet Temporary Mobile Subscriber Identity (PTMSI) recorded in a Subscriber Identification Module (SIM) card in a mobile communication terminal according to an exemplary embodiment of the present invention is described below.

Figure 1:
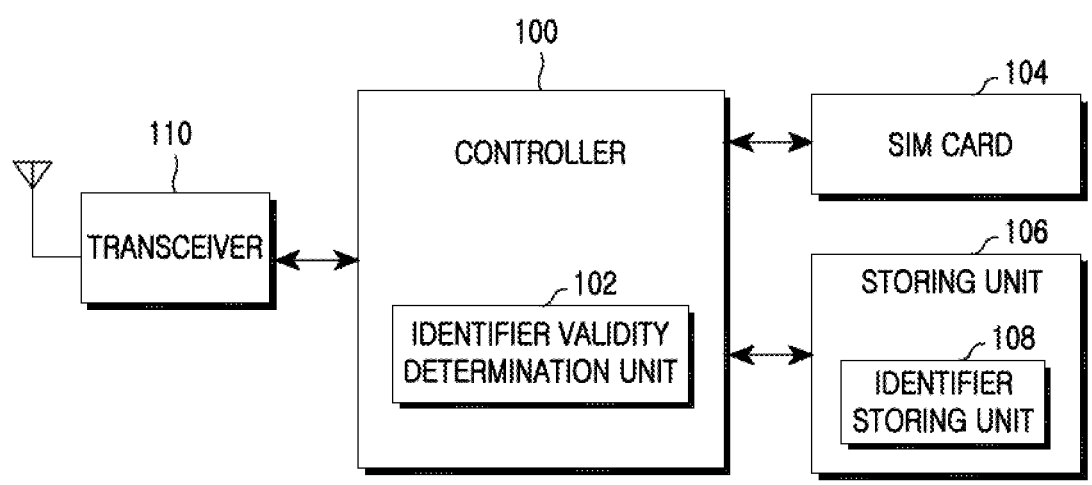
FIG. 1 is a block diagram illustrating a mobile terminal according to an exemplary embodiment of the present invention.

FIG. 1 is a block diagram illustrating a mobile terminal according to an exemplary embodiment of the present invention.

Referring to FIG. 1, the terminal includes a controller 100, a SIM card 104, a storing unit 106, and a transceiver 110. The controller 100 includes an identifier validity determination unit 102. The storing unit 106 includes an identifier storing unit 108.

The controller 100 processes and controls operations of the mobile communication terminal, and more particularly, when a TMSI or PTMSI is received from a network through the transceiver 110, controls a function for storing the received TMSI or PTMSI in the SIM card 104 and the storing unit 106. Also, when an event of having to transmit an International Mobile Subscriber Identity (IMSI), TMSI, or PTMSI to the network occurs, the controller 100 determines whether there exists a TMSI or PTMSI having a valid value in the SIM card 104 using the identifier validity determination unit 102, and determines whether the TMSI or PTMSI stored in the storing unit 106 and the TMSI or PTMSI stored in the SIM card 104 are the same through comparison. Also, the controller 100 determines which of the IMSI, TMSI, and PTMSI is to be transmitted to the network. When the stored TMSIs or PTMSIs are the same, the identifier validity determination unit 102 determines to transmit the TMSI or PTMSI to the network. When the stored TMSIs or PTMSIs are not the same, the identifier validity determination unit 102 determines that the SIM card 104 has changed, and determines to transmit an IMSI recorded in the currently inserted SIM card 104 to the network. Here, when the stored TMSIs or PTMSIs are not the same, the identifier validity determination unit 102 initializes the TMSI or PTMSI recorded in the SIM card 104 and then may transmit the initialized TMSI or PTMSI to the network. In an exemplary implementation, the identifier validity determination unit 102 initializes the TMSI or PTMSI recorded in the SIM card 104 to a preset value. Also, when the TMSIs or PTMSIs stored in the identifier storing unit 108 and the SIM card 104 are not the same, the identifier validity determination unit 102 may control a series of processes for being assigned a TMSI or PTMSI having a new value from the network.

The SIM card 104 is attachable/detachable to/from the mobile communication terminal. The SIM card 104 may include a microprocessor and a memory chip and stores various information of a user. For example, the SIM card 104 may store an IMSI, TMSI, PTMSI and the like. Here, the TMSI is a value activated from a network for a voice call, and the PTMSI is a value activated from the network for a packet data service.

The storing unit 106 stores microcodes of a program for the process and control of the controller 100, and various reference data. The storing unit 106 also stores temporary data generated during execution of various programs, and various updatable data for storage. More particularly, the storing unit 106 stores a TMSI or PTMSI provided by the controller 100 in the identifier storing unit 108. Here, the identifier storing unit 108 may include a nonvolatile memory where stored data is retained even when the power of the terminal is turned on/off.

The transceiver 110 converts a signal received from a base station via an antenna to a baseband signal, provides the baseband signal to the controller 100, converts a signal provided by the controller 100 into an RF signal, and transmits the RF signal to the base station via the antenna. More particularly, according to an exemplary embodiment of the present invention, the transceiver 110 receives a TMSI or PTMSI from the base station, provides the received TMSI or PTMSI to the controller 100, and transmits the IMSI, TMSI, or PTMSI provided by the controller 100 to the base station.

Figure 2:
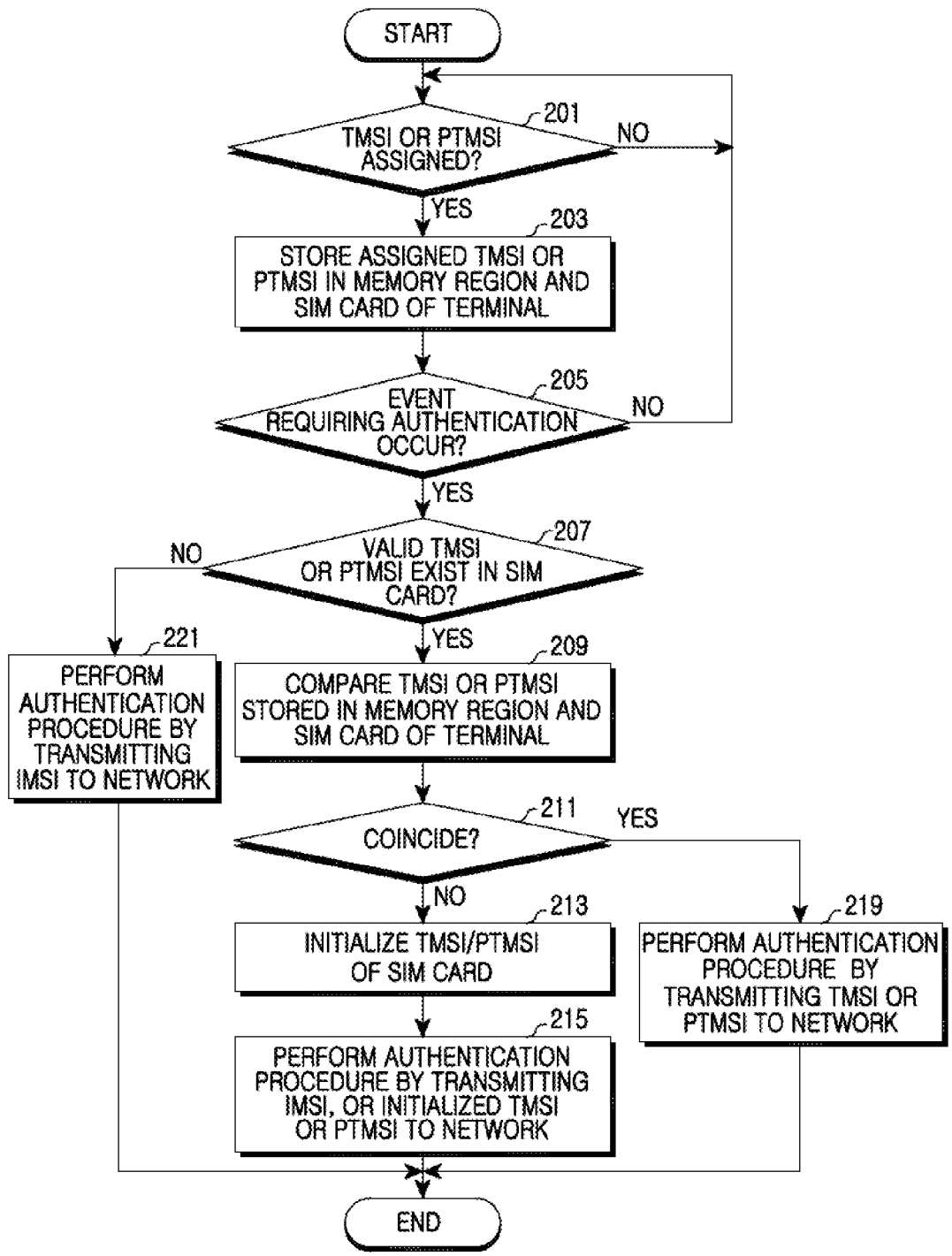
FIG. 2 is a flowchart illustrating a procedure of determining validity of a mobile subscriber identifier in a mobile terminal according to an exemplary embodiment of the present invention.

FIG. 2 is a flowchart illustrating a procedure of determining validity of a mobile subscriber identifier in a mobile terminal according to an exemplary embodiment of the present invention.

Referring to FIG. 2, in step 201, the terminal determines whether a TMSI or PTMSI is assigned from a network via a base station. In an exemplary implementation, the TMSI or PTMSI may be assigned from a Home Location Register (HLR) of the network. Here, the TMSI or PTMSI may be assigned whenever the terminal performs a location registration, or may be assigned while a service is performed after the location registration. That is, the TMSI or PTMSI may be arbitrarily reassigned from the network.

When the TMSI or PTMSI is assigned, in step 203, the terminal stores the assigned TMSI or PTMSI in the identifier storing unit 108, which may include a nonvolatile memory region of the terminal, and the SIM card 104. In step 205, the terminal determines whether an event requiring network authentication occurs. That is, the terminal determines whether an event of having to transmit an IMSI, TMSI, or PTMSI to the network occurs. When the event does not occur, the terminal returns to step 201 and repeats the subsequent steps.

On the other hand, when an event requiring network authentication occurs, the terminal determines whether there exists a TMSI or PTMSI having a valid value in the SIM card 104 in step 207. That is, the terminal determines whether a TMSI or PTMSI having a value within a range defined by specification is stored in the SIM card 104.

When there does not exist a TMSI or PTMSI having a valid value in the SIM card 104, the terminal performs an authentication procedure by transmitting the IMSI stored in the SIM card 104 to the network in step 221, and ends the operation according to an exemplary embodiment of the present invention.

On the other hand, when it is determined in step 207 that there does exist a TMSI or PTMSI having a valid value in the SIM card 104, the terminal compares the TMSI or PTMSI stored in the identifier storing unit 108, which is the memory region of the terminal, with the TMSI or PTMSI stored in the SIM card in step 209. In step 211, the terminal determines whether the TMSI or PTMSI stored in the identifier storing unit 108 coincides with the TMSI or PTMSI stored in the SIM card 104.

When it is determined that the TMSI or PTMSI stored in the identifier storing unit 108 coincides with the TMSI or PTMSI stored in the SIM card 104 in step 211, the terminal performs the authentication procedure by transmitting the TMSI or PTMSI of the SIM card 104 to the network in step 219, and ends the operation according to an exemplary embodiment of the present invention.

On the other hand, when it is determined that the TMSI or PTMSI stored in the identifier storing unit 108 does not coincide with the TMSI or PTMSI stored in the SIM card 104 in step 211, the terminal initializes the TMSI or PTMSI of the SIM card 104 in step 213. In an exemplary implementation, the terminal may initialize the TMSI or PTMSI of the SIM card 104 to a preset value.

In step 215, the terminal performs the authentication procedure by transmitting the IMSI of the SIM card 104 to the network, or transmitting the initialized TMSI or PTMSI to the network. Here, when the TMSI or PTMSI stored in the identifier storing unit 108 is different from the TMSI or PTMSI stored in the SIM card 104, the terminal may be assigned a TMSI or PTMSI having a new value by performing a series of processes with the network.

After that, the terminal ends the operation according to an exemplary embodiment of the present invention.

According to an exemplary embodiment of the present invention, a mobile terminal stores a TMSI or PTMSI assigned from a network in a memory and a SIM card inside the terminal. When a network authentication procedure is required, the terminal compares the TMSI or PTMSI stored in the memory with the TMSI or PTMSI stored in the SIM card inside the terminal. When the TMSI or PTMSI stored in the memory coincides with the TMSI or PTMSI stored in the SIM card, the terminal transmits the TMSI or PTMSI to the network. When the TMSI or PTMSI stored in the memory does not coincide with the TMSI or PTMSI stored in the SIM card, the terminal transmits the IMSI to the network. Therefore, when a SIM card is replaced and inserted into the mobile terminal, security may be improved by performing the authentication procedure on the basis of an IMSI of the replaced SIM card.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for determining validity of a mobile subscriber identifier in a mobile communication terminal, the method comprising: storing, respectively, a first and a second temporary identifier assigned from a network in a memory and a Subscriber Identification Module (SIM) card of the terminal; when a network authentication event occurs, comparing the first temporary identifier stored in the memory with the second temporary identifier stored in the SIM card and determining whether the second temporary identifier in the SIM card has a value within a valid range; when it is determined that the first and second temporary identifiers do not have a value within the valid range, performing an authentication with the network using an International Mobile Subscriber Identity (IMSI); initializing the second temporary identifier stored in the SIM card to a preset value when the first temporary identifier in the memory and the second temporary identifier in the SIM card, respectively, are not the same as a result of the comparison; and determining to transmit the second initialized temporary identifier to the network.

2. The method of claim 1, wherein the first and second temporary identifiers comprise at least one of a Temporary Mobile Subscriber Identity (TMSI) and a Packet Temporary Mobile Subscriber Identity (PTMSI).

3. The method of claim 1, wherein the memory comprises a nonvolatile memory.

4. A mobile communication terminal comprising: a memory for storing a temporary identifier assigned from a network; a Subscriber Identification Module (SIM) card for storing the temporary identifier assigned from the network, and an International Mobile Subscriber Identity (IMSI) assigned when a subscriber subscribes to a service; and a controller for comparing a first temporary identifier stored in the memory with a second temporary identifier stored in the SIM card, for determining whether the second temporary identifier in the SIM card has a value within a valid range; and for determining an identifier to be transmitted to the network depending on a result of the comparison when a network authentication event occurs, wherein when the first temporary identifier in the memory and the second temporary identifier in the SIM card, respectively, are not the same as a result of the comparison, the controller determines to initialize the second temporary identifier stored in the SIM card to a preset value, and transmit the initialized second temporary identifier to the network, and when it is determined that the first and second temporary identifiers do not have a value within the valid range, performing an authentication with the network using an International Mobile Subscriber Identity (IMSI).

5. The method of claim 1, further comprising, when the first and second temporary identifiers stored in the memory and the SIM card, respectively, are not the same as a result of the comparison, being assigned a new temporary identifier from the network.

6. A mobile communication terminal comprising:
 a memory for storing a temporary identifier assigned from a network;
 a Subscriber Identification Module (SIM) card for storing the temporary identifier assigned from the network, and an International Mobile Subscriber Identity (IMSI) assigned when a subscriber subscribes to a service; and
 a controller for comparing a first temporary identifier stored in the memory with a second temporary identifier stored in the SIM card, for determining whether the second temporary identifier in the SIM card has a value within a valid range; and for determining an identifier to be transmitted to the network depending on a result of the comparison when a network authentication event occurs,
 wherein when the first temporary identifier in the memory and the second temporary identifier in the SIM card, respectively, are not the same as a result of the comparison, the controller determines to initialize the second temporary identifier stored in the SIM card to a preset value, and transmit the initialized second temporary identifier to the network, and when it is determined that the first and second temporary identifiers do not have a value within the valid range, performing an authentication with the network using an International Mobile Subscriber Identity (IMSI).

7. The mobile communication terminal of claim 6, wherein the first and second temporary identifiers comprise at least one of a Temporary Mobile Subscriber Identity (TMSI) and a Packet Temporary Mobile Subscriber Identity (PTMSI).

8. The mobile communication terminal of claim 6, wherein the memory comprises a nonvolatile memory.

9. The mobile communication terminal of claim 6, wherein, when the first and second temporary identifiers stored in the memory and the SIM card, respectively, are the same as a result of the comparison, the controller determines to transmit the second temporary identifier stored in the SIM card to the network.

10. The mobile communication terminal of claim 6, wherein when the first and second temporary identifiers stored in the memory and the SIM card, respectively, are not the same as a result of the comparison, the controller controls an operation for being assigned a new temporary identifier from the network.

* * * * *